(12) United States Patent
Agrawal et al.

(10) Patent No.: US 9,910,889 B2
(45) Date of Patent: *Mar. 6, 2018

(54) RAPID SEARCHING AND MATCHING OF DATA TO A DYNAMIC SET OF SIGNATURES FACILITATING PARALLEL PROCESSING AND HARDWARE ACCELERATION

(71) Applicant: International Business Machines Corporation, Armonk, NY (US)

(72) Inventors: Dakshi Agrawal, Monsey, NY (US); Rashed Z. Bhatti, Fremont, CA (US); Francis N. Parr, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 301 days.

This patent is subject to a terminal disclaimer.

(21) Appl. No.: 14/746,340

(22) Filed: Jun. 22, 2015

(65) Prior Publication Data
US 2016/0188751 A1    Jun. 30, 2016

Related U.S. Application Data

(63) Continuation of application No. 14/584,516, filed on Dec. 29, 2014.

(51) Int. Cl.
*G06F 17/30* (2006.01)
*G06F 17/27* (2006.01)

(52) U.S. Cl.
CPC .... *G06F 17/30424* (2013.01); *G06F 17/2705* (2013.01); *G06F 17/30339* (2013.01); *G06F 17/30864* (2013.01); *G06F 17/30952* (2013.01); *G06F 17/30985* (2013.01)

(58) Field of Classification Search
None
See application file for complete search history.

(56) References Cited

U.S. PATENT DOCUMENTS

| 7,558,925 B2 | 7/2009 | Bouchard et al. |
| 2003/0229708 A1 | 12/2003 | Lie et al. |
| 2003/0229710 A1 | 12/2003 | Lie et al. |

(Continued)

OTHER PUBLICATIONS

List of IBM Patents or Patent Applications Treated as Related, 2 pages.

(Continued)

*Primary Examiner* — Khanh Pham
(74) *Attorney, Agent, or Firm* — Stephen R. Tkacs; Stephen J. Walder, Jr.; Kurt P. Goudy

(57) ABSTRACT

A mechanism is provided in a data processing system for matching data to a dynamic set of signatures. The mechanism creates a state transition, result, and mask (STR&M) table based on a set of signatures. The mechanism executes scanner code in each of a plurality of hardware devices in parallel to form a plurality of matching engines. The mechanism loads the STR&M table into each of the plurality of matching engines. Responsive to receiving a plurality of input records, the mechanism distributes input strings from the plurality of input records among the plurality of matching engines and receiving signature set match results from the plurality of matching engines.

11 Claims, 6 Drawing Sheets

(56) References Cited

U.S. PATENT DOCUMENTS

| | | | |
|---|---|---|---|
| 2005/0132342 A1* | 6/2005 | Van Lunteren ... | G06F 17/30985 717/143 |
| 2006/0193159 A1* | 8/2006 | Tan ................... | G06F 17/30949 365/49.16 |
| 2007/0130140 A1* | 6/2007 | Cytron .............. | G06F 17/30985 707/999.006 |
| 2007/0150622 A1* | 6/2007 | Kravec ................ | G06K 9/6202 710/1 |
| 2011/0252046 A1 | 10/2011 | Szabo et al. | |
| 2012/0203761 A1* | 8/2012 | Biran ................ | G06K 9/00986 707/713 |

OTHER PUBLICATIONS

"Matching as a Service—A Cloud Based Approach to Probabilistic Data Matching", IP.com No. IPCOM000234880D, Jan. 28, 2014, 7 pages.

IBM, "Method and Apparatus for String Matching Against Large Dictionaries", IP.com No. IPCOM000180895D, Mar. 20, 2009, 10 pages.

\* cited by examiner

| STATES | \multicolumn{6}{c}{INPUT CONDITION OR INPUT CHARACTER VALUES} | RESULTS | MASK |

| STATES | $C_0$ | $C_1$ | $C_2$ | $C_3$ | ... | $C_M$ | RESULTS | MASK |
|---|---|---|---|---|---|---|---|---|
| $S_0$ | | | | | | | 0 | 000 |
| $S_1$ | | | | | | | $R_1$ | FFF |
| $S_2$ | | | | | | | 0 | 000 |
| $S_3$ | | | | | | | $R_2$ | FFF |
| $S_4$ | | | | | | | 0 | 000 |
| ... | | | | | | | 0 | 000 |
| ... | | | | | | | $R_3$ | FFF |
| ... | | | | | | | $R_3$ | FFF |
| $S_F$ | | | | | | | 0 | 000 |

EACH CELL SPECIFIES NEXT SCANNER STATE FOR A PARTICULAR <CURRENT STATE> x <INPUT CONDITION> COMBINATION DURING MATCH PROCESSING

RESULT IDENTIFIES THE ID OF MATCHED SIGNATURE OR 0 IF NO MATCH

MASKS ARE SHOWN AS HEXADECIMAL STRINGS

*FIG. 3*

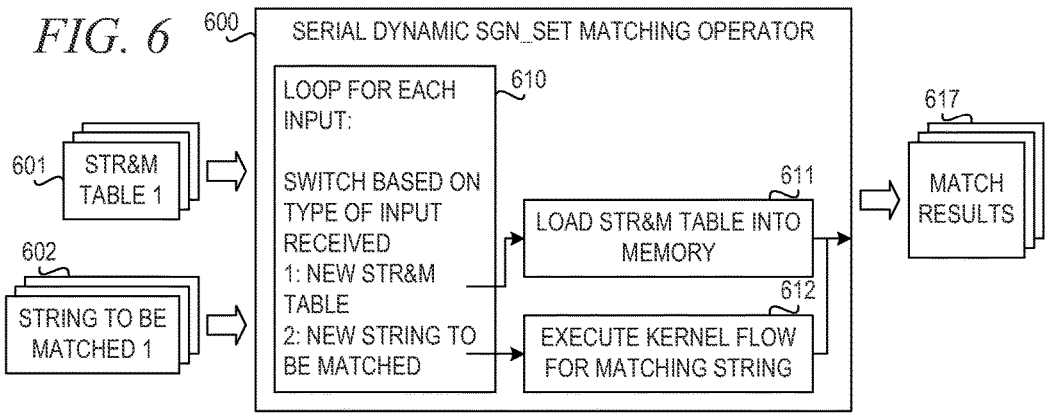
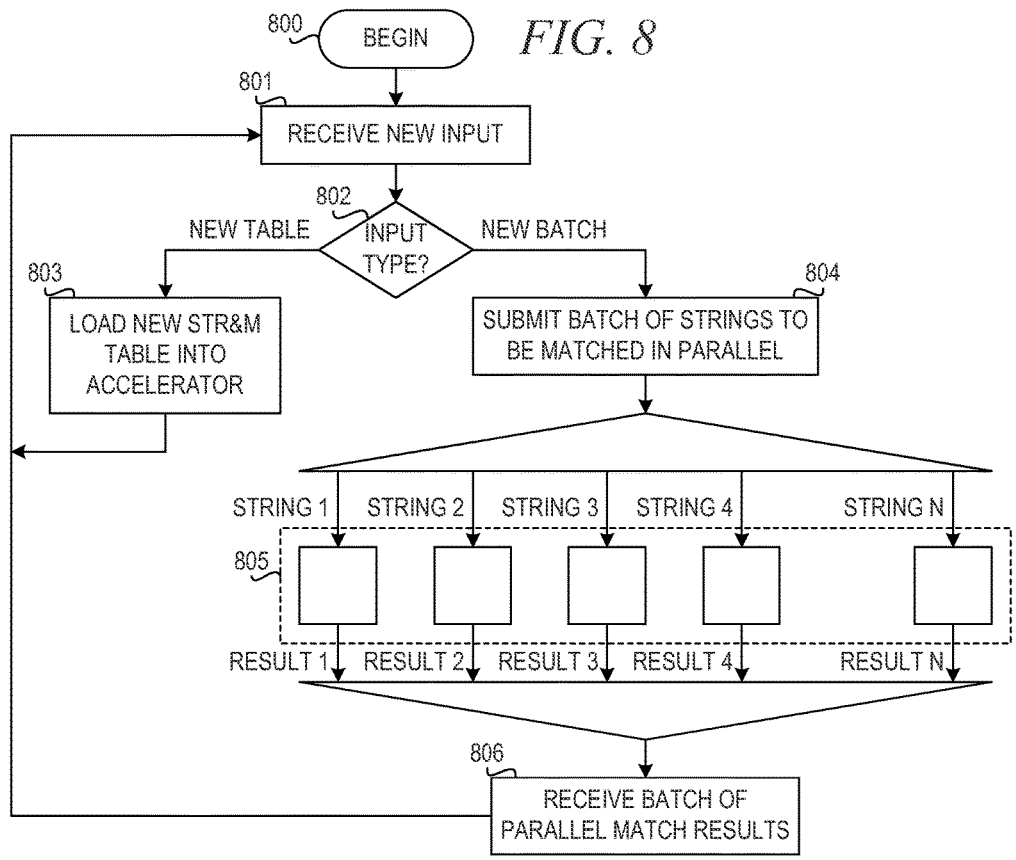

US 9,910,889 B2

RAPID SEARCHING AND MATCHING OF DATA TO A DYNAMIC SET OF SIGNATURES FACILITATING PARALLEL PROCESSING AND HARDWARE ACCELERATION

BACKGROUND

The present application relates generally to an improved data processing apparatus and method and more specifically to mechanisms for rapid searching and matching of data to a dynamic set of signatures facilitating parallel processing and hardware acceleration.

"Big Data" is an aft-encompassing term for any collection of data sets so large and complex that it becomes difficult to process using traditional data processing applications. The challenges include analysis, capture, curation, search, sharing, storage, transfer, visualization, and privacy violations. The trend to larger data sets is due to the additional information derivable from analysis of a single large set of related data, as compared to separate smaller sets each structured to address a specific processing need, allows broad correlations to be found to spot business trends, prevent diseases, combat crime, and so on. Processing of large data sets is important for fields such as fraud detection, custom profile analytics, deoxyribonucleic acid (DNA) analysis, etc.

Information management (IM) is the collection and management of information from one or more sources and the distribution of that information to one or more audiences. This sometimes involves those who have a stake in, or a right to, that information. Management means the organization of and control over the planning, structure, processing, evaluating, and reporting of information activities in order to meet client objectives and to enable enterprise functions in the delivery of information.

SUMMARY

In one illustrative embodiment, a method, in a data processing system, is provided for matching data to a dynamic set of signatures each of which may be a Regular Expression (RE), a set of keywords or some other recognizable patterns or generic sequence of symbols. The method comprises creating a state transition, result, and mask (STR&M) table defining the scanning logic to detect these signature patterns in the incoming data. The method further comprises executing scanner code in each of a plurality of hardware devices in parallel to form a plurality of matching engines. The method further comprises loading the STR&M table into each of the plurality of matching engines. The method further comprises extracting input strings from the plurality of input records received at the plurality of matching engines and receiving signature set match results from the plurality of matching engines.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 3 depicts a state transition, result, and mask (STR&M) table in accordance with an illustrative embodiment;

FIG. 6 is a block diagram for dynamic update of a signature set matching operator also showing serial processing of input by that operator, a serial dynamic signature set matching operator, in accordance with an illustrative embodiment;

FIG. 8 is a flowchart illustrating operation of a hardware accelerated runtime in accordance with an illustrative embodiment.

DETAILED DESCRIPTION

Figure 1:
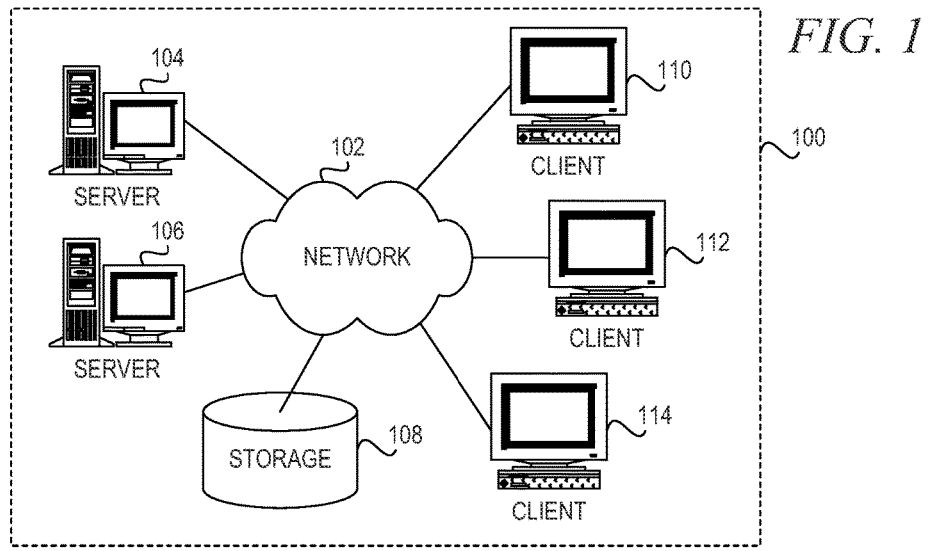
FIG. 1 is an example diagram of a distributed data processing system in which aspects of the illustrative embodiments may be implemented.

In the Big Data world, it is important to be able to process arriving data records at high speed to identify which of the records include a source string matching one of a set of predefined signatures. Each signature can be expressed as a Regular Expression (RE), set of keywords or other recognizable pattern or generic sequence of symbols of data. The result of processing for each arriving input string is to report which, if at least one, of the target signatures is matched. The set of signatures to be matched may be large, perhaps in the hundreds or more, and the set may be frequently changed or refined to better fit the target data of interest as the users' interests and understanding of the arriving data changes. It is advantageous for updating of the target signature set to be non-disruptive.

Signatures, which are Regular Expressions or finite sets of keywords, are detectable by a finite state automaton. The illustrative embodiments provide a mechanism for rapid processing for a particular specified set of signatures. The signatures may take the form of a search for a specific pattern or combination of patterns anywhere within the arriving string. In the illustrative embodiments, the processing to analyze and match input strings is accelerated through organization of the processing in STR&M table next state lookup, avoidance of branching logic, and use of hardware parallelism; additional embodiments show how dynamic signature sets in a distributed deployment can be supported by distributing the STR&M table in binary format not requiring compilation at each deployment site.

Computer processing hardware and standardized software interfaces for access are available allowing specialized additional acceleration of processing of Regular Expressions. Examples of acceleration hardware include Single Instruction Multiple Data (SIMD), Graphics Processing Unit (GPU), and Field Programmable Gate Array (FPGA) hardware devices. Interfaces such as Open Computing Language (OpenCL) make these capabilities accessible through software interfaces on standard general purpose processors and operating systems.

Open Computing Language (OpenCL) is a framework for writing programs that execute across heterogeneous platforms consisting of central processing units (CPUs), graphics processing units (GPUs), digital signal processors (DSPs), field-programmable gate arrays (FPGAs) and other processors. OpenCL includes a language for programming these devices and application programming interfaces (APIs) to control the platform and execute programs on the compute devices. OpenCL provides parallel computing using task-based and data-based parallelism.

Compute Unified Device Architecture (CUDA) is a parallel computing platform and programming model created by NVIDIA and implemented by the graphics processing units (GPUs) that they produce. CUDA gives developers direct access to the virtual instruction set and memory of the parallel computational elements in CUDA GPUs.

The illustrative embodiments provide a mechanism for rapid searching and matching of data to a dynamic set of signatures facilitating parallel processing and hardware acceleration. The mechanism comprises a state transition, result, and mask (STR&M) table, kernel logic, and hardware accelerated runtime flow. For each input string, the kernel logic loops, advancing the current read position in the input string in each iteration, until a signature is recognized or the input string is known to not match any signature in the search set. The mechanism also comprises preprocessing to generate the STR&M table from a set of Regular Expression signatures and a basic runtime to receive a stream of input strings to be matched with the current Regular Expression signature set.

In the hardware accelerated runtime flow, the core processing kernel is downloaded to a processing acceleration unit. The mechanism uses the same kernel logic and STR&M data organization within each parallel facility of the accelerator. The hardware accelerated runtime flow passes a block of records with strings to be matched in parallel and receives returned results in parallel. In one embodiment, the hardware accelerated runtime flow uses a software interface to hardware processing units to enable retuning of applications to exploit new accelerators as they become available or as they become more cost effective.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

In a first illustrative embodiment, a mechanism is provided for dynamic Regular Expression signature set matching in a stream computing environment with serial (per thread) processing. In this embodiment, the mechanism uses software accelerated matching in a stream computing environment.

In a second illustrative embodiment, a mechanism is provided for dynamic signature set matching in a stream computing environment with hardware acceleration. For example, the mechanism may use Advanced Vector Extensions (AVX), Graphics Processing Units (GPUs), Field Programmable Gate Array (FPGA) devices, or other specialized processing acceleration. In this embodiment, the mechanism provides hardware accelerated matching in a stream computing environment.

In a third illustrative embodiment, a mechanism is provided for stand-alone acceleration of signature set matching with or without hardware acceleration. In this embodiment, the mechanism is provided in a general purpose processing environment.

Figure 2:
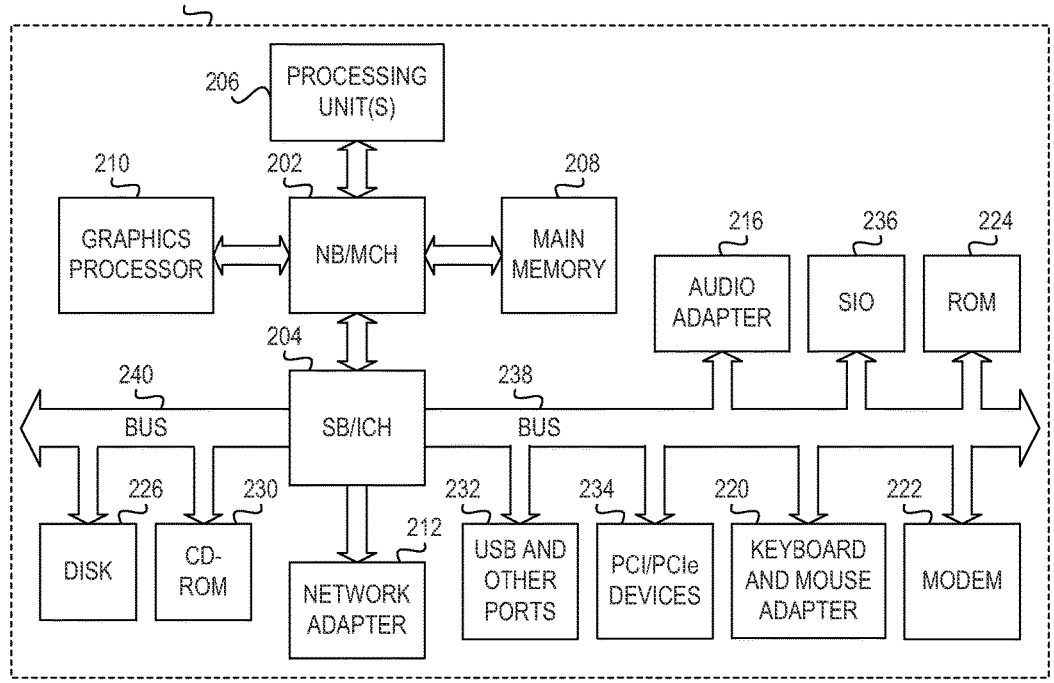
FIG. 2 is an example block diagram of a computing device in which aspects of the illustrative embodiments may be implemented.

The illustrative embodiments ma be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 is a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is interconnected by a network 102 representing a collection of networks and gateways that may use the Transmission Control Protocol/Internet Protocol (TCP/IP) suite of protocols to communicate with one another. This could be the worldwide Internet or could be a private (TCP/IP) network deployed by a particular organization for its use. Private TCP/IP networks may or may not be connected to the worldwide Internet but have resources, security and privacy controls set by and managed for the benefit of the owning organization. At the heart of any TCP/IP network is a backbone of high-speed data communication lines between major nodes or host computers. In the case of the worldwide Internet, this consists of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System P® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 depicts a state transition, result, and mask (STR&M) table in accordance with an illustrative embodiment. Each row in the table corresponds to a state of scanner logic while processing an input string and matching it to a specific set of signatures or Regular expressions. In the depicted STR&M table, $S_0$ is an initial state, and $S_F$ is a persistent final "NO_MATCH" state. Other states correspond to input strings with continuations to a signature RE. Columns in the central area of the table $C_0$-$C_M$ denote a set of input conditions or input character values. Input conditions are the result of applying an input symbol map to the input character value to reduce the size of the next state table when multiple input character values have the same effect on match processing logic. The intersection of a current state and a set of input conditions provides the next state transition. As an example, for the current state $S_2$ and the set of input conditions $C_3$, the next state may be $S_9$.

Some states are matches corresponding to a complete signature; others are incomplete such that if this is the processing state after the final character of the input string is read, then there is a "NO_MATCH" output. Each signature has a result code indicating the specific signature within the signature set that is matched. For each state for which there is a success state (matching signature), the results column contains a value and the mask column contains a mask for updating the result. Some signatures correspond to more than one string expression.

Use of the mask column further reduces branching in result code determinations. In some embodiments it is desirable to match the signature set greedily—i.e., to find the longest subset of the input string that matches one of the signatures in the signature set. This requires that the scanner remember when a match has been found at some earlier position and the input and update to a new result only if a longer successful match to some different signature is found. The following result update logic uses mask and result column values to propagate matching result correctly from one character position to the next without use of branching logic: result=((result & ~stPtr[s][MCOL])+(stPtr[s][RCOL] & stPtr[s][MCOL])), where result is the matching result so far from the previous character position, stPtr[s] is the pointer to the current state, stPtr[s][MCOL] is the value in the mask column of the current state, and stPtr[s][RCOL] is the value in the result column of the current state. For example, if the previous result was a match to signature 5, the value of the mask column for the current state is a string of 1s and the value in the result column of the current state is 7, then the result is as follows: result=(5×not(1))+(7×1)=7. Thus, the mask is used to determine the result conditionally without using a branch instruction hence improving performance on modern computer processors. A feature of the STR&M organization of signature set matching is that the same table can be used with slightly different scanning logic to deliver first match, priority match, greedy match, or all matches to the input string for that specific set of signatures to be matched. We will provide more on the relationship of scanning logic to the STR&M table in the discussion of FIG. 4.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD)), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
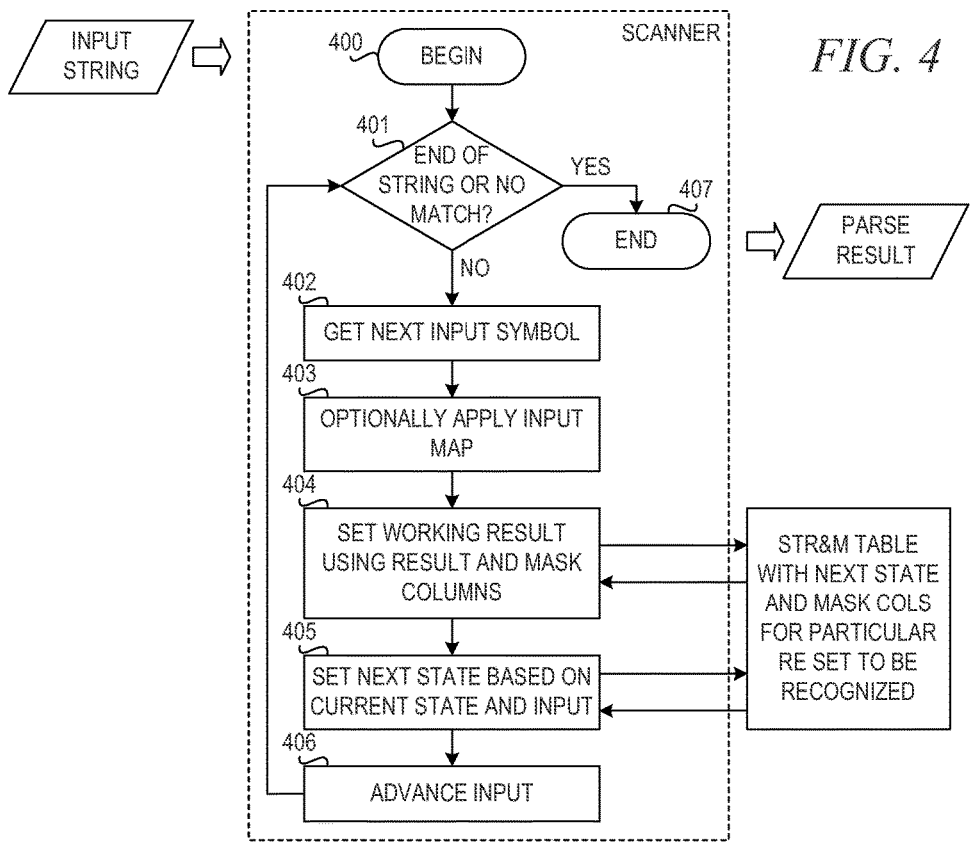
FIG. 4 is a flowchart illustrating operation of a kernel in accordance with an illustrative embodiment.

FIG. 4 is a flowchart illustrating operation of a kernel in accordance with an illustrative embodiment. Operation begins (block 400) when the scanner in the kernel receives an input string. The scanner is the loop with the universal processing flow independent of the particular signature set recognizer encoded in the STR&M table. The scanner determines for a given input string whether any starting substring matches any of the signatures in the signature set corresponding to this STR&M table. Each iteration of the flow loop represents advancing one character position in the input string. In block 401 it tests whether the end of the input string has been reached or if this input string cannot result in a match (block 401). If the scanner has not reached the end of the string and does not determine that there is no match, then the scanner gets the next input symbol from the input string (block 402). The scanner optionally applies an input map (block 403) converting the input character value to a specific input condition.

The scanner sets the working result using the result column and mask column (block 404) using the STR&M table with result and mask columns for a particular signature set to be recognized. Setting a working result could be storing the match result to be returned as the final result of the scan or adding this result to a data structure which allows all successful matches for different initial substrings of the input to be returned as the final results. The STR&M table providing result and mask column values may be the table shown in FIG. 3. The scanner then sets the next state based on the current state and the set of inputs (block 405) using the STR&M with next state columns dependent upon the set of input conditions. Thereafter, the scanner advances the input (block 406) and returns to block 401 to determine whether scanner reaches the end of the string or determines that there is no match. If the scanner does reach the end of the string or determines that there is no match, then the scanner outputs the parse result or results which have been saved during step 404 in iterations of the loop. Control flow ends at label 407.

Figure 5:
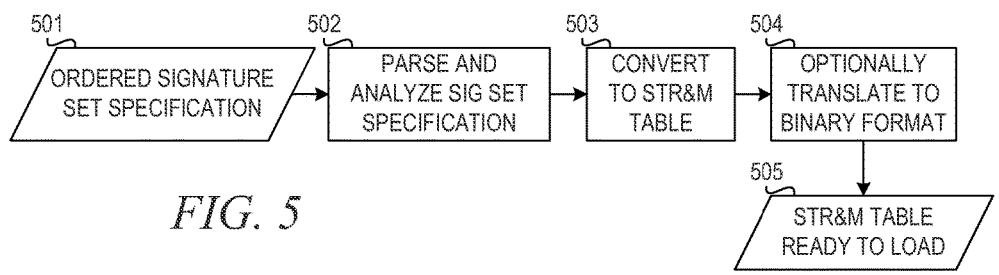
FIG. 5 is a flowchart illustrating operation of a signature set specification processing in accordance with an illustrative embodiment.

FIG. 5 is a flowchart illustrating operation of a mechanism for signature set specification processing in accordance with an illustrative embodiment. Operation begins upon receiving an ordered signature set specification (block 501). The mechanism parses and analyzes the signature set specification (block 502). This may use a known stage to generate a Finite State Machine (FSM) table. Then, the mechanism converts the FSM table to a state transition, result, and mask (STR&M) table (block 503). The mechanism optionally translates the STRAW table to a binary format (block 504). The mechanism then outputs the STR&M table ready to load (block 505).

In an example embodiment, the preprocessing may reduce the size of the STR&M table through input symbol map. For example if the scanner scans for—the key words "dog" or "cat" appearing anywhere in input strings expressed in the ASCII character set, all character values other than a, c, d, g, o, t can be mapped to a single "not_in_key_strings" input condition reducing the number of input character conditions This preprocessing reduces the size of the STR&M table by reducing the number of columns.

The signature set specification may be ordered to ensure that at any character position in an input string there is at most one (prioritized) signature match. If the requirement is for first match rather than the longest (greedy) match within the input string, once a match is identified for a given input string, the signature set matching operator can provide a result on first match without determining whether the given input string also matches some other longer hence not yet detected signature.

FIG. 6 is a block diagram of a serial dynamic signature set matching operator in accordance with an illustrative embodiment. This diagram shows dynamic updating of the set of signatures being matched. Serial dynamic signature set matching operator 600 receives a sequence of STR&M tables 601 and a stream of strings to be matched 602. Kernel 610 loops for each input and switches based on the type of input received. If the input is a new STR&M table 601, then kernel 610 loads the STR&M table into memory (block 611). If the input is a new record (string) to be matched, then kernel 610 executes kernel flow for matching the string to signatures (block 612). Serial dynamic signature set matching operator 600 outputs signature set match results 617.

In an illustrative embodiment, STR&M tables 601 are in binary format ready to be loaded into the runtime environment. The kernel/scanner code is compiled and executed and loads each arriving STR&M table 601 as data. Thus, for each received binary table 601, the table may be swapped without having to reset the runtime environment.

Figure 7:
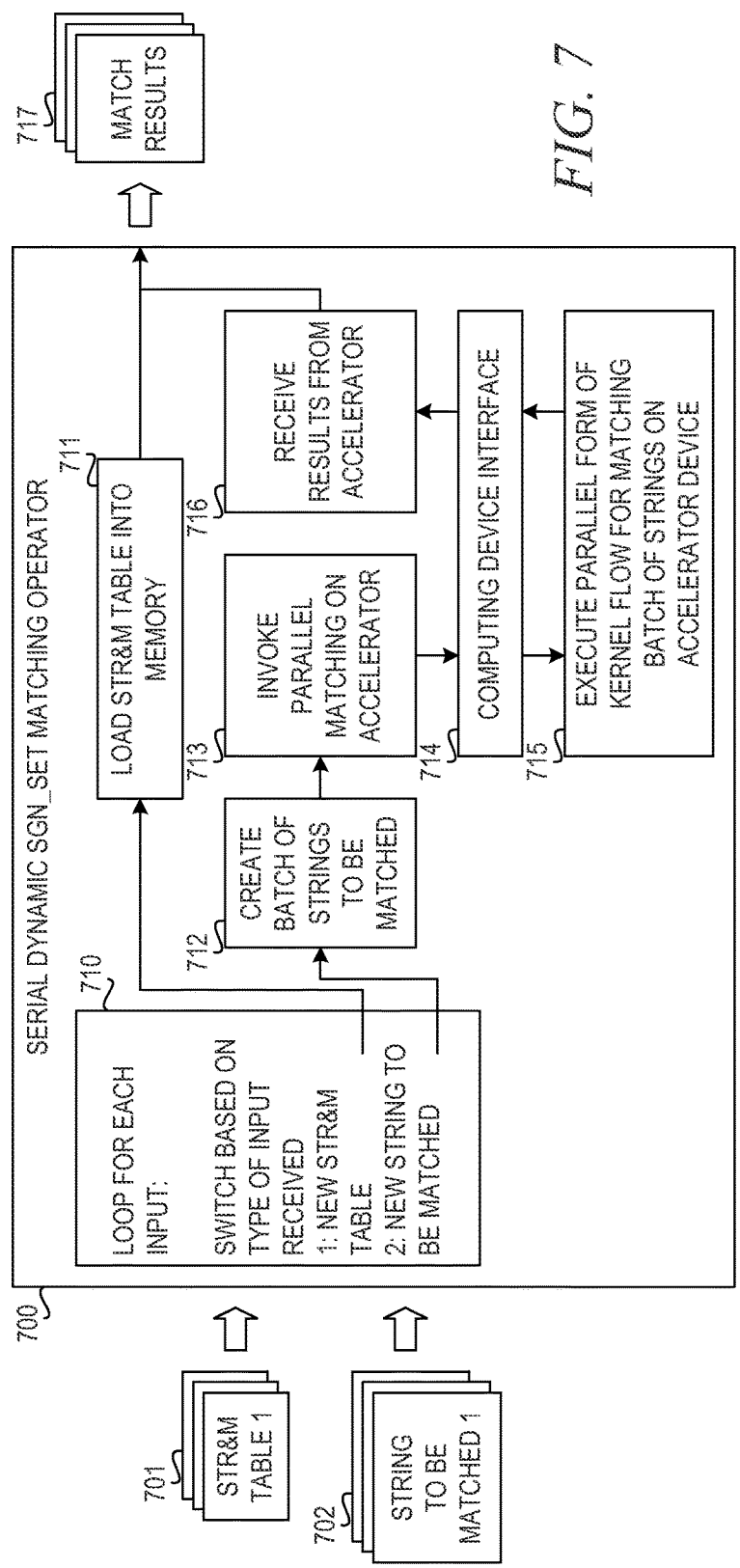
FIG. 7 is a block diagram of a serial dynamic signature set matching operator with hardware accelerated runtime flow in accordance with an illustrative embodiment.

FIG. 7 is a block diagram of a serial dynamic signature set matching operator with hardware accelerated runtime flow in accordance with an illustrative embodiment. Serial dynamic signature set matching operator 700 receives a sequence of STR&M tables 701 and a stream of strings to be matched 702. Kernel 710 loops for each input and switches based on the type of input received. If the input is a new STR&M table 701, then kernel 710 loads the STR&M table into memory (block 711).

If the input is a new string to be matched, then kernel 710 creates a batch of strings to be matched or add this new string into a previously created batch waiting to be completed (block 712). Operator 700 invokes parallel matching on an accelerator (block 713) through computing device interface 714, which executes a parallel form of kernel flow for matching the batch of strings on the accelerator device (block 715). Operator 700 then receives results from the accelerator device through computing device interface 714 (block 716). Operator 700 outputs batch of parallel match results 717.

FIG. 8 is a flowchart illustrating operation of a hardware accelerated runtime in accordance with an illustrative embodiment. Operation begins (block 800), and the hardware accelerated runtime receives a new input (block 801). The hardware accelerated runtime determines an input type for the new input (block 802). If the new input is a new table, the hardware accelerated runtime loads the new STR&M table into the accelerator (block 803). Thereafter, operation returns to block 801 to receive the next input.

If the new input is a batch of new input strings to be matched in block 802, the hardware accelerated runtime sends this batch of stings to be matched in parallel using a hardware accelerator interface (block 804). In block 805, the hardware accelerated runtime uses a software interface to pass arriving records with strings to be matched to hardware devices in parallel. Each unit in the accelerator runs an independent instance of kernel match flow using the current STR&M table. Each hardware unit receives one or more strings and returns one or more results. The hardware accelerated runtime then returns the batch of parallel match results (block 806). Thereafter, operation returns to block 801 to receive the next input.

The hardware accelerated runtime partitions the input records into data chunks (strings) that can be matched independently and in parallel. The hardware accelerated runtime organizes the partitioned data chunks into one or more data buffers accessible to the hardware devices.

Figure 9:
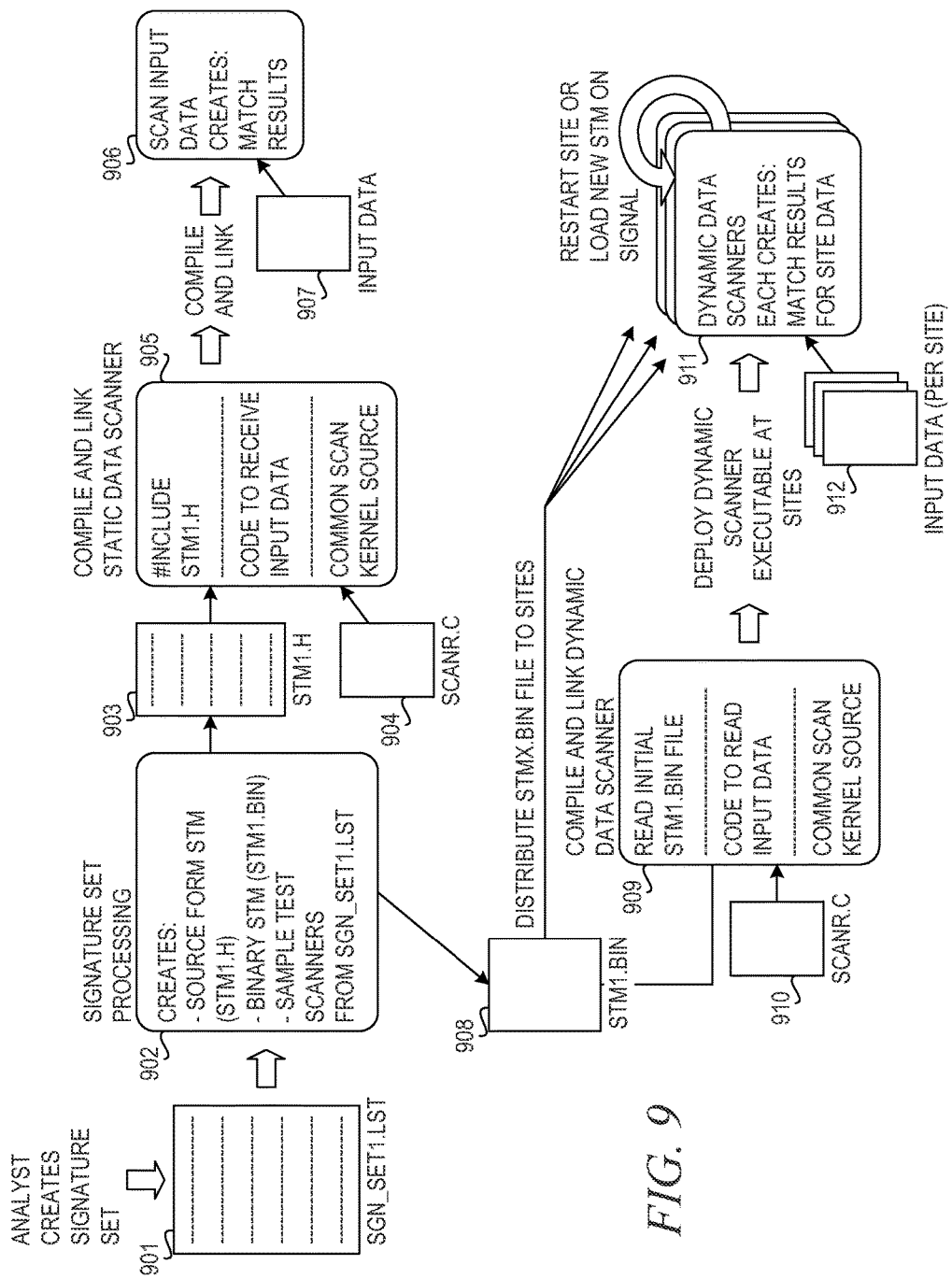
FIG. 9 depicts an overview of an example derivation, distribution, and deployment of data scanners in accordance with an illustrative embodiment.

FIG. 9 depicts an overview of an example derivation, distribution and deployment of data scanners in accordance with an illustrative embodiment. An analyst creates a signature set 901 each of whose elements may be Regular Expressions (REs), sets of keywords or other easily recognizable character string patterns. Signature-to-state machine processing 902 generates from the signature set a state machine 903 and a binary form of the state machine 908. Sample test scanners may also be generated for testing and signature set preparation. A compile and link step 905 includes a source form of the STM specification, together with code to receive input data at run time and source code for the scanner logic in some programming language such as C, C++ Java etc. shown as element 904. This scanner logic is common i.e. not specific to any particular signature set being matched. The result of the compile and link processing in block 905 is to produce a static data scanner. This is shown deployed in block 906 receiving input data from 907 and generating match results indicating for each input whether any of the signatures in 901 were matched.

A second output from the signature set processing 902 is the binary representation of the STM 908. This is used either to generate an initial dynamic data scanner or it is distributed to one or more deployment sites to dynamically update the signature set being matched at those sites. Processing block 909 shows compilation and linking of the dynamic data scanner. This involves reading the initial binary STM from a file, including code to receive input data at run time and including source code for a common scan routine from 910. The result of compile and link processing in 909 is to create an executable for a dynamic scanner which can be deployed in each scan site. The deployed dynamic scanners are shown in block 911. Dynamic updating of the STM in use in these scanners occurs in the following manner. When a new STMx.BIN appears as a result of the distribution of STM.BIN files to deployment sites, each site can either be restarted or can, on a signal, load the new STM logic and resume input processing continuing to create matching results for the input data at that site to the updated signature set. The input data to be matched at each site is shown in 912.

Thus, the illustrative embodiments provide a mechanism for rapid searching and matching of data to a dynamic set of signatures facilitating parallel processing and hardware acceleration. Matching can be performed at a high rate on arriving data records. The signature patterns to be matched include matching a specific target string at any position in the input record data. Multiple, potentially hundreds, of signatures of this form can be in the set of match targets. The signature set to be matched can be changed dynamically with minimal observable disruption to the continued processing of arriving data records to be matched. The result of match processing is to identify the signature matched in each input data record or a function of it, or to report that this input matches none of the current signatures.

The mechanism of the illustrative embodiments compiles hundreds of signatures into a single parallel traversable memory data structure. The mechanism is capable of matching thousands of parallel streams with a variety of data formats in parallel. The parallel streams may be mapped to vectorized, Single Instruction Multiple Data (SIMD), or Single Instruction Multiple Thread (SIMT) types of high performance computing platforms. In addition, the mechanism of the illustrative embodiments minimizes or avoids branching using embedded result and mask columns in the STR&M table. The mechanism converts from task-parallel to data-parallel execution. The illustrative embodiments also provide the ability to dynamically change the core signatures on the fly.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for matching data to a dynamic set of signatures, the method comprising:
   creating a state transition, result, and mask (STR&M) table based on a set of signatures, wherein the STR&M table comprises a state column, a plurality of condition columns, a result column, and a mask column, wherein each condition column corresponds to a set of input conditions that result from applying an input symbol map to an input character value, wherein for a given state each condition column corresponds to a set of input conditions and provides a next state transition, wherein the result column provides an identifier of a matched signature or an indicator of no match, and wherein the mask column provides a mask for updating a result, wherein a first row of the STR&M table corresponds to an initial state, a last row of the STR&M table corresponds to a persistent final NO_MATCH state, and other rows of the STR&M table correspond to input strings with continuations to a signature;
   executing scanner code in each of a plurality of hardware devices in parallel to form a plurality of matching engines;
   loading the STR&M table into each of the plurality of matching engines;
   responsive to receiving a plurality of input records at the plurality of matching engines, extracting input strings from the plurality of input records;
   submitting the plurality of input strings for scanning by the plurality of matching engines;
   scanning, by the scanner code in each given matching engine, the plurality of input strings based on the STR&M table, comprising:
      for a current state, responsive to at least a portion of a current input string matching a set of conditions corresponding to a given condition column, updating a signature set match result based on a result value in the result column and a mask value in the mask column without use of branching logic; and
      responsive to reaching an end of the current input string or the NO_MATCH state, returning the signature set match result; and
   receiving signature set match results from the plurality of matching engines.

2. The method of claim 1, wherein creating the STR&M table comprises:
   receiving a signature set specification;
   parsing and analyzing the signature set specification;
   generating a Finite State Machine (FSM) table based on a result of the parsing and analyzing of the signature set specification; and
   converting the FSM table to the STR&M table.

3. The method of claim 2, wherein creating the STR&M table further comprises translating the STR&M table to a binary format.

4. The method of claim 2, wherein the signature set specification is ordered to ensure that at any character position in an input string there is at most one prioritized signature match.

5. The method of claim 1, wherein the scanner code uses the mask and result column values to update the signature matching result without use of branching logic as follows:
   result=((result & ~stPtr[s][MCOL])+(stPtr[s][RCOL] & stPtr[s][MCOL])),
      where result is the signature set matching result so far from a previous character position, stPtr[s] is a pointer to the current state, stPtr[s][MCOL] is a value of the mask column of the current state, and stPtr[s][RCOL] is a value of the result column of the current state.

6. The method of claim 1, wherein the scanner code in each matching engine sets a next state based on a current state and the input symbol using the STR&M table, and advances input to a next input symbol until the end of the given current input string is reached or the NO_MATCH state is reached.

7. The method of claim 1, wherein responsive to a given matching engine receiving a new STR&M table in binary form, the given matching engine loads the new STR&M table.

8. The method of claim 1, wherein the plurality of hardware devices comprise a plurality of Single Instruction Multiple Data (SIMD), Graphics Processing Unit (GPU), or Field Programmable Gate Array (FPGA) hardware devices.

9. The method of claim 8, wherein extracting the input strings from the plurality of input records comprises communicating through a computing device interface.

10. The method of claim 9, wherein the computing device interface comprises an Open Computing Language (OpenCL) application programming interface.

11. The method of claim 8, wherein the plurality of hardware devices comprise a Compute Unified Device Architecture (CUDA) parallel computing platform.

\* \* \* \* \*